United States Patent [19]
Gasc et al.

[11] 3,914,420
[45] Oct. 21, 1975

[54] NOVEL ANTIANDROGENIC COMPOUNDS

[75] Inventors: Jean-Claude Gasc, Bondy; Vesperto Torelli, Maisons-Alfort, both of France

[73] Assignee: Roussel Uclaf, Paris, France

[22] Filed: Dec. 3, 1973

[21] Appl. No.: 421,089

[30] Foreign Application Priority Data
Dec. 19, 1972 France .............................. 72.45173

[52] U.S. Cl. .......... 424/243; 260/397.4; 260/397.5; 260/239.55 R
[51] Int. Cl.².......................................... A61K 31/56
[58] Field of Search........................... 424/180, 243; 260/239.55 D

[56] References Cited
UNITED STATES PATENTS
3,708,474  1/1973  Nedelec et al. ............. 260/239.55 R

*Primary Examiner*—Elbert L. Roberts
*Attorney, Agent, or Firm*—Hammond & Littell

[57] ABSTRACT

Novel steroids of the formula

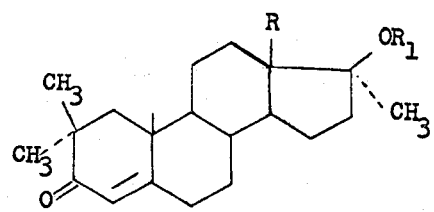

I wherein R is alkyl of 1 to 3 carbon atoms and $R_1$ is selected from the group consisting of hydrogen, alkyl of 1 to 4 carbon atoms and α-tetrahydropyranyl with the proviso that R is not methyl where $R_1$ is hydrogen having antiandrogenic properties and novel intermediates.

3 Claims, No Drawings

NOVEL ANTIANDROGENIC COMPOUNDS

STATE OF THE ART

U.S. Pat. No. 2,976,302 describes a wide variety of androstanes including 2,2,17α-trimethyl-Δ⁴-androstene-17β-ol3-one which was allegedly used as an intermediate for 2,2,17αtrimethyl-Δ⁴-androstene-3,17β-diol. French Pat. No. 2,115057 describes certain 2,2-dimethyl-trienic steroids as having antiandrogenic activity.

OBJECTS OF THE INVENTION

It is an object of the invention to provide novel Δ⁴-gonenes of formula I.

It is another object of the invention to provide novel processes and novel intermediates for the compounds of formula I.

It is a further object of the invention to provide novel antiandrogenic compositions and to provide a novel method of treating hyperandrogenia in warm-blooded animals.

These and other objects and advantages of the invention will become obvious from the following detailed description.

THE INVENTION

The novel 2,2-dimethyl-Δ⁴-gonenes of the invention have the formula

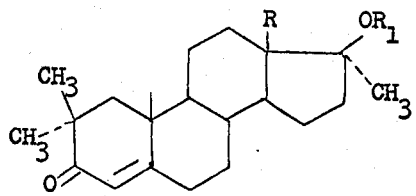

wherein R is alkyl of 1 to 3 carbon atoms and $R_1$ is selected from the group consisting of hydrogen, alkyl of 1 to 4 carbon atoms and α-tetrahydropyranyl with the proviso that R is not methyl where $R_1$ is hydrogen.

The preferred substituents for R are methyl, ethyl and propyl and for $R_1$ are methyl ethyl, propyl and butyl where $R_1$ is alkyl The process of the invention is based on kinetically controlled gem-dimethylation α to a α, β-ethylenic ketone through an enolate intermediate at low temperatures. The process comprises reacting a compound of the formula

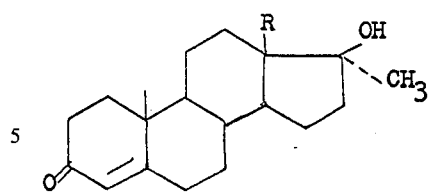

wherein R is alkyl of 1 to 3 carbon atoms with a labile blocking agent to protect the 17β-ol group and reacting the latter with a methyl halide at low temperatures in the presence of a basic agent to form the 2,2-dimethyl product of the formula

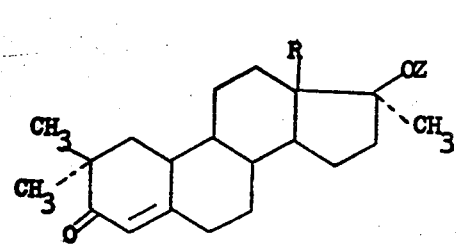

wherein Z is the blocking group and hydrolyzing the latter in an acid media to obtain a compound of formula I wherein R is alkyl of 1 to 3 carbon atoms and $R_1$ is hydrogen. The latter can be etherified by standard methods to form the compounds of formula I wherein $R_1$ is alkyl of 1 to 4 carbon atoms or α-tetrahydropyranyl.

If desired, the blocking group may be α-tetrahydropyranyl and therefore in formula III, Z would be α-tetrahydropyranyl when dihydropyran is used as the blocking agent. Other blocking agents are trityl chloride or silanes such as trimethylchlorosilane with the reaction being effected in the presence of a carboxylic acid or sulfonic acid or in the presence of pyridine.

The methyl halide is preferably methyl iodide and the basic agent may be an alkali metal hydride, alkali metal alcoholate or an alkali metal amide. This reaction is preferably effected in an aprotic solvent such as tetrahydrofuran, most preferably in the presence of a polar aprotic solvent such as hexamethylphosphorotriamide at temperatures of −65° to −30°C.

The acid hydrolysis of the compound of formula III may be effected with an aqueous carboxylic acid such as formic acid or acetic acid or an aqueous mineral acid such as hydrochloric acid or sulfuric acid.

The final etherification may be effected with an alkyl chloride of the formula $R_1Cl$ wherein $R_1$ is alkyl of 1 to 4 carbon atoms in the presence of dimethylformamide to form the alkyl ether or with dihydropyran in the presence of a concentrated mineral acid such as concentrated hydrochloric acid to form the corresponding α-tetrahydropyranyl ether.

The novel intermediates of the invention have the formula

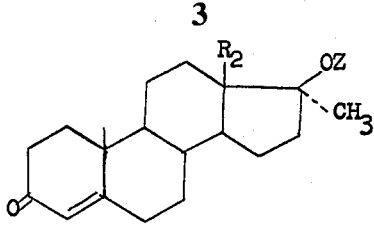

wherein $R_2$ is alkyl of 2 to 3 carbon atoms and Z is selected from the group consisting of triloweralkylsilyl, triphenylmethyl and α-tetrahydropyranyl.

The starting products of formula II may be prepared by the process described in Helv. Chim. Acta, Vol. 18 (1935), p. 1487 when R is methyl, by the process of French Pat. No. 2,013,877 when R is ethyl and by the process of U.S. Pat. No. 3,624,111 when R is propyl.

The novel antiandrogenic compositions of the invention are comprised of at least one compound of the formula

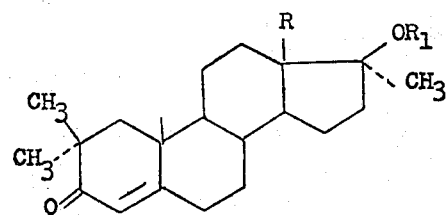

I' wherein R is alkyl of 1 to 3 carbon atoms and $R_1$ is selected from the group consisting of hydrogen, alkyl of 1 to 4 carbon atoms and α-tetrahydropyranyl and a pharmaceutical carrier. The compositions may be in the form of injectable solutions or suspensions in ampoules, multiple dose flacons or ready to use syringes or in the form of tablets, coated tablets, dragees, gelules, cachets, emlusions, syrups or granules, sublingual tablets, suppositories, creams or lotions. Preferred are 2,2,17α-trimethyl-Δ⁴-androstene-17β-ol-3-one and 2,2,17α-trimethyl-17β-tetrahydropyranyloxy-Δ⁴-androstene-3-one.

The compositions have a strong antiandrogenic activity and inhibit the effect of androgens on peripheric receptors without giving injury to the normal function of the genital organs and hypophysis. They may be used for children without fear of arresting their growth and in adults without having fear of effects of chemical castration.

The compositions equally show an antiestrogenic activity which make them useful for the treatment of hyperfolliculinie and of puberty troubles or menopause flow. The compositions are useful as medicaments for the treatment of prostatic adenome, of hirsutism, of acne, of seborrhea and of hyperpilosity.

The novel method of the invention for treating hyperandrogenia in warm-blooded animals comprises administering to warm-blooded animals an effective amount of at least one compound of formula I'. The compounds may be administered parenterally, orally, perlingually, topically or rectally. The usual daily dose is 0,2 to 5 mg/kg depending upon the method of administration and the specific product.

In the following example there are described several preferred embodiments to illustrate the invention. However, it should be understood that the invention is not intended to be limited to the specific embodiments.

EXAMPLE 2,2,17α-trimethyl-Δ⁴-androstene-17Δ-ol-3-one

STEP A: 17α-methyl-17β-tetrahydropyranyloxy-Δ⁴-androstene-3-one 100 mg of p-toluene sulfonic acid monohydrate were added to a suspension of 6g of 17α-methyl-testosterone in 6 ml of dihydropyran and 18 ml of ether and total dissolution occurred in 15 minutes. 2 ml of dihydropyran were added thereto and the mixture was stirred for 1½ hours at room temperature. p-toluene sulfonic acid was neutralized with an excess of triethylamine and the mixture was diluted with ether, was washed with water and evaporated to obtain 17α-methyl-17β-tetrahydropyranyloxy-Δ⁴-androstene-3-one in the form of a clear yellow oil which was used as is for the next step.

STEP B: 2,2,17α-trimethyl-17β-tetrahydropyranyloxy-Δ⁴-androstene-3-one

The oil from Step A was dissolved in 25 ml of tetrahydrofuran containing 20 ml of methyl iodide and the resulting solution was cooled to −60°C. A solution of 13.4 g of potassium tert.-butylate in 60 ml of tetrahydrofuran was added thereto with stirring at a rate to keep the temperature between −60° and −50°C and after the end of the addition, the mixture was added to a water-ice mixture. The reaction mixture was extracted with methylene chloride and the organic phase was washed with water, dried over magnesium sulfate and evaporated to dryness to obtain 2,2,17α-trimethyl-17β-tetrahydropyranyloxy-Δ⁴-androstene-3-one in the form of crystals used as is for the next step.

STEP C: 2,2,17α-trimethyl-Δ⁴-androstene-17β-ol-3-one

The crystals of Step B were dissolved at 50°C in 27 ml of acetic acid and after cooling the solution to room temperature, 2 ml of water and 1 ml of concentrated hydrochloric acid were added thereto. After standing for one-half hour, the mixture was diluted with water and extracted with methylene chloride. The organic phase was washed with water, then with aqueous sodium bicarbonate solution, dried over magnesium sulfate and evaporated to dryness. The residue was chromatographed over silica gel using a 9-1 benzene-ethyl acetate mixture as eluant. The product was crystallized from isopropyl ether to obtain 5.2 g of 2,2,17α-trimethyl-Δ⁴-androstene-17β-ol-3-one in the form of colorless crystals melting at 135° C and having a specific rotation $[\alpha]_D^{20} = + 30°$ (c = 1% in chloroform).

Analysis: $C_{22}H_{34}O_2$ Calculated: %C 79.95 %H 10.37 Found: 80.1 10.5

PHARMACOLOGICAL STUDY

A. Androgenic Activity

The method used was the Hershberger described in Proc. Soc. Exp. Biol. Med., Vol. 83 (1953), p. 175 in which castrated male rats about 4 weeks old received subcutaneously daily for seven days 2,2,17α-trimethyl- Δ⁴-androstene-17β-ol-3-one, compound A, dissolved in 0.2 ml of sesame oil containing 5% of benzylic alcohol. The animals were killed 24 hours after the end of treatment and the prostate, seminal vesicles and levator ani were recovered and weighed to determine the increase in weight of the organs which indicates androgenic activity. The results are shown in Table I.

TABLE I

| Treatment | Daily Dose | Levator ani in mg | Seminal Vesicles in mg | Prostate in mg |
|---|---|---|---|---|
| Controls | 0 | 32.4 | 14.7 | 12.7 |
| Compound A | 1 mg | 34.3 | 17.5 | 22.9 |
| Controls | 0 | 23.5 | 11.1 | 18.8 |
| Compound A | 5 mg | 30.0 | 11.5 | 24.5 |
| Controls | 0 | 24.2 | 6.6 | 10.3 |
| Methyl-testosterone | 10 μg | 26.1 | 13.9 | 33.3 |
|  | 50 μg | 44.8 | 51.6 | 73.0 |

Table I shows that compound A has an androgenic activity 100 times less than methyl testosterone.

B. Exogenic antiandrogenic Activity

The exogenic antiandrogenic activity of compound A was determined against testosterone propionate on castrated male rats by the test of Lerner described by Dorfman in Methods in Hormone Research, Vol. II (1962), P. 320 in which immature male rats about 4 weeks old were castrated. Treatment began the day after castration and lasted for 7 days. On the 8th day, the animals were killed and the prostate, seminal vesicules and levator ani were removed and weighed to determine androgenic activity. The products were subcutaneously administered in sesame oil containing 5% benzylic alcohol. One group of animals served as controls, another group received 50 μg of testosterone propionate and another group received separately 50 μg of testosterone propionate and 1 or 5 mg of compound A. The results are reported in Table II.

The results of Table II show that compound A exercise a clear antiandrogenic activity at a dose of 1 mg against 50 μg of testosterone propionate.

C. Uterotrophic Activity

The method used was that of Rubin et al [Endocrinology, Vol. 49 (1951), p.429] in which groups of 4 immature Swiss mice 18 days old and weighing about 12 g subcutaneously received daily for 3 days compound A in 0.1 ml of sesame oil containing 5% benzylic alcohol. The animals were killed 24 hours after the end of treatment and the uterus was removed and weighed to ascertain the weight increase which indicates uterotrophic activity. The results are reported in Table III.

TABLE III

| Treatment | Total Doses in μg | Weight of Uterus in mg |
|---|---|---|
| Controls | 0 | 14.3 |
| Compound A | 30 | 17.2 |
|  | 90 | 24.5 |
|  | 270 | 13.3 |
| Controls | 0 | 14.2 |
| Estradiol | 0.03 | 18.6 |
|  | 0.09 | 31.9 |
|  | 0.27 | 63.1 |

The results of Table III show that the uterotrophic activity of compound A is 1,000 times less than that of estradiol.

D. Hypophysial inhibiting Activity

This test was that of McGinty et al [Ann. N.Y. Acad. Sci., Vol. 71 (1958), p. 500] in which groups of 5 male rats about 3 months old received over 2 weeks a dozen subcutaneous injections of compound A in solution in 0.2 ml of sesame oil containing 5% benzylic alcohol. The animals were killed 24 hours after the end of treatment and the testicules and surrenal glands were recovered and weighed. Then, the seminal vesicles and prostate were recovered and weighed after fixation with a solution of 10 % formal in physiological serum and dissection. The lessening of weight of the different organs indicated hypophysial inhibiting activity. The results are shown in Table IV.

TABLE IV

| Treatment | Daily Doses | Testicules in g | Surrenals in mg | Seminal Vesicules in mg | Prostate in mg |
|---|---|---|---|---|---|
| Controls | 0 | 3.28 | 43.7 | 621.8 | 402.5 |
| Compound A | 2 mg | 3.00 | 43.3 | 565.9 (−9%) | 350.8 (−17%) |
|  | 10 mg | 3.13 | 42.6 | 512.6 (−18%) | 297.4 (−30%) |
| Ethynyl nor testosterone | 0.2 mg | 2.91 (−11%) | 40.5 | 414.1 (−34%) | 254.9 (−40%) |

TABLE II

| Treatment | Daily Dose | Levator ani in mg | Seminal Vesicules in mg | Prostate in mg |
|---|---|---|---|---|
| Controls | 0 | 32.4 | 14.7 | 12.7 |
| Testosterone Propionate | 50 μg | 47.1 | 143.1 | 132.5 |
| Compound A +Testosterone Propionate | 1 mg (+50 μg) | 39.6 (−16%) | 99.8 (−30%) | 108.2 (−18%) |
| Controls | 0 | 23.5 | 11.1 | 18.8 |
| Testosterone Propionate | 50 μg | 48.0 | 110.9 | 118.3 |
| Compound A +Testosterone Propionate | 5 mg (+50 μg) | 34.6 (−28%) | 36.1 (−67%) | 48.4 (−60%) |

The results of Table IV show that the hypophysial inhibiting activity of compound A is about 50 times less than that of ethynyl nor testosterone.

Various modifications of the compositions and processes of the invention may be made without departing from the spirit or scope thereof and it is to be understood that the invention is to be limited only as defined in the appended claims.

We claim:

1. An antiandrogenic composition comprising an antiandrogenically effective amount of at least one compound of the formula

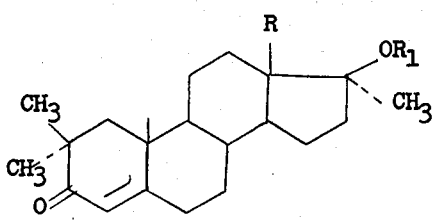

wherein R is alkyl of 1 to 3 carbon atoms and $R_1$ is selected from the group consisting of hydrogen, alkyl of 1 to 4 carbon atoms and α-tetrahydropyranyl and a pharmaceutical carrier.

2. A method of inducing antiandrogenic activity in warm-blooded animals which comprises administering to warm-blooded animals an antiandrogenically effective amount of a compound of the formula

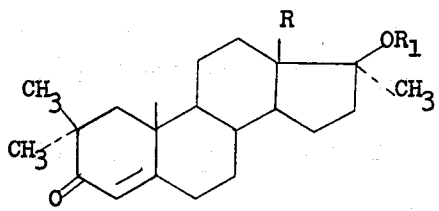

wherein R is alkyl of 1 to 3 carbon atoms and $R_1$ is selected from the group consisting of hydrogen, alkyl of 1 to 4 carbon atoms and α-tetrahydropyranyl.

3. The method of claim 2 wherein the compound is 2,2,17α-trimethyl-$\Delta^4$-androstene-17β-ol-3-one.

* * * * *